US011654933B2

(12) United States Patent
Hwu et al.

(10) Patent No.: US 11,654,933 B2
(45) Date of Patent: May 23, 2023

(54) NAVIGATION TRAJECTORY USING REINFORCEMENT LEARNING FOR AN EGO VEHICLE IN A NAVIGATION NETWORK

(71) Applicant: GM GLOBAL TECHNOLOGY OPERATIONS LLC, Detroit, MI (US)

(72) Inventors: Tiffany J. Hwu, San Diego, CA (US); Iman Mohammadrezazadeh, Los Angeles, CA (US); Michael J. Daily, Thousand Oaks, CA (US); Rajan Bhattacharyya, Sherman Oaks, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 287 days.

(21) Appl. No.: 17/094,255

(22) Filed: Nov. 10, 2020

(65) Prior Publication Data
US 2022/0144309 A1 May 12, 2022

(51) Int. Cl.
*B60W 60/00* (2020.01)
*G06N 3/04* (2023.01)
*B60W 30/12* (2020.01)

(52) U.S. Cl.
CPC ........ *B60W 60/0011* (2020.02); *B60W 30/12* (2013.01); *G06N 3/04* (2013.01);
(Continued)

(58) Field of Classification Search
CPC ............ B60W 60/0011; B60W 30/12; B60W 2556/40; B60W 2555/20; B60W 2552/10; G06N 3/04
(Continued)

(56) References Cited

U.S. PATENT DOCUMENTS 8,634,593 B2 * 1/2014 Zhang .................... G08G 1/165
382/104
8,699,754 B2 * 4/2014 Zhang .................. G06V 20/588
348/148
(Continued)

FOREIGN PATENT DOCUMENTS

| CA | 3060914 A1 * | 5/2020 | ............. G06F 17/16 |
|---|---|---|---|
| JP | 2018172028 A * | 11/2018 | ............. B60W 10/04 |
| WO | WO-2018087877 A1 * | 5/2018 | ............. B60K 28/06 |

OTHER PUBLICATIONS

Mnih, V. et al. "Asynchronous Methods for Deep Reinforcement Learning", Proceedings of the 33rd International Conference on Machine Learning, Journal of Machine Learning Research, vol. 48: pp. 1928-1937, New York, NY, USA, 2016.
(Continued)

*Primary Examiner* — Richard A Goldman
(74) *Attorney, Agent, or Firm* — Quinn IP Law (57) ABSTRACT

An ego vehicle includes decider modules and a grader module coupled to a resolver module. The decider modules generate trajectory decisions at a current time, generate a current two-dimensional slice of a flat space around the ego vehicle, generate future two-dimensional slices of the flat space by projecting the current two-dimensional slice of the flat space forward in time, and generate a three-dimensional state space by stacking the current two-dimensional slice and the future two-dimensional slices. The grader module generates rewards for the trajectory decisions based on a recent behavior of an ego vehicle. The resolver module selects a final trajectory decision for the ego vehicle from the trajectory decisions based on the three-dimensional state space and the rewards. The current two-dimensional slice includes a current ego vehicle location and current neighboring vehicle locations. The future two-dimensional slices
(Continued)

include future ego vehicle locations and future neighboring vehicle locations.

20 Claims, 8 Drawing Sheets

(52) U.S. Cl.
CPC ..... *B60W 2552/10* (2020.02); *B60W 2555/20* (2020.02); *B60W 2556/40* (2020.02)
(58) Field of Classification Search
USPC .......................................................... 701/27
See application file for complete search history.

(56) References Cited

U.S. PATENT DOCUMENTS

| | | | | |
|---|---|---|---|---|
| 10,891,518 B1* | 1/2021 | Joshi | ..................... | G01S 13/931 |
| 2012/0027255 A1* | 2/2012 | Endo | ..................... | G06V 20/588 |
| | | | | 382/103 |
| 2013/0103305 A1* | 4/2013 | Becker | .................. | G01C 21/32 |
| | | | | 701/410 |
| 2015/0354976 A1* | 12/2015 | Ferencz | ............... | G05D 1/0251 |
| | | | | 382/104 |
| 2017/0169301 A1* | 6/2017 | Kunze | ..................... | B60Q 1/143 |
| 2019/0061712 A1* | 2/2019 | Melik-Barkhudarov | ..................... | |
| | | | | B60T 8/172 |
| 2019/0152488 A1* | 5/2019 | Kotteri | ................ | B60W 40/076 |
| 2019/0347821 A1* | 11/2019 | Stein | ................ | G08G 1/096725 |
| 2020/0122717 A1* | 4/2020 | Kim | ........................ | B60R 11/04 |
| 2020/0249685 A1* | 8/2020 | Elluswamy | ............... | G06T 7/20 |
| 2020/0250473 A1* | 8/2020 | Elluswamy | ............ | G16Y 20/10 |
| 2021/0078575 A1* | 3/2021 | Machida | ............... | B60W 50/14 |
| 2021/0125076 A1* | 4/2021 | Zhang | .................. | G06N 3/0454 |
| 2021/0171025 A1* | 6/2021 | Ishikawa | ........... | B60W 30/0956 |
| 2021/0229708 A1* | 7/2021 | Kondo | .............. | B60W 60/0059 |
| 2021/0276581 A1* | 9/2021 | Sekine | .................. | B60W 50/12 |
| 2021/0295058 A1* | 9/2021 | Hashimoto | .......... | G06V 10/809 |
| 2021/0387651 A1* | 12/2021 | Kuroda | ............. | B60W 60/0027 |
| 2021/0406082 A1* | 12/2021 | Asao | ..................... | G06F 9/3871 |
| 2022/0001872 A1* | 1/2022 | Taieb | ..................... | G01C 21/20 |
| 2022/0063671 A1* | 3/2022 | Niewiadomski | ..... | B60W 30/095 |
| 2022/0144309 A1* | 5/2022 | Hwu | ........................ | G06N 3/04 |
| 2022/0172396 A1* | 6/2022 | Okuma | .................. | G06T 7/215 |
| 2022/0247597 A1* | 8/2022 | Kurokawa | ........ | H04L 12/40163 |
| 2022/0309521 A1* | 9/2022 | Stenneth | ............ | G07C 9/00896 |
| 2022/0315061 A1* | 10/2022 | Ishikawa | ......... | B60W 60/00253 |

OTHER PUBLICATIONS https://github.com/MG2033/A2C/blob/master/README.md, Oct. 22, 2020, 5 pages.
https://zguide.zeromq.org/docs/preface/, Oct. 22, 2020; 3 pages.

* cited by examiner

NAVIGATION TRAJECTORY USING REINFORCEMENT LEARNING FOR AN EGO VEHICLE IN A NAVIGATION NETWORK

INTRODUCTION

The present disclosure relates to a system and a method for navigation trajectory using reinforcement learning for an ego vehicle in a navigation network.

Many existing in-vehicle trajectory planning systems produce a single trajectory for a current state of the vehicle and a surrounding environment. However, a state space used to determine the trajectory is typically large, with input states that include all available visual information and granular output actions, such as steering angle and gas pedal acceleration. To train a neural network to determine the single trajectory, many parameters are tuned and data sets of different scenarios are often employed.

What is desired is a technique for navigation trajectory using reinforcement learning for an ego vehicle in a navigation network.

SUMMARY

An ego vehicle is disclosed herein. The ego vehicle includes a plurality of decider modules and a grader module. The plurality of decider modules is coupled to a resolver module. The plurality of decider modules is configured to generate a plurality of trajectory decisions at a current time, generate a current two-dimensional slice of a flat space around the ego vehicle, generate a plurality of future two-dimensional slices of the flat space around the ego vehicle by projecting the current two-dimensional slice of the flat space forward in time, and generate a three-dimensional state space by stacking the current two-dimensional slice and the plurality of future two-dimensional slices. The grader module is coupled to the resolver module. The grader module is configured to generate a plurality of rewards for the plurality of trajectory decisions based on a recent behavior of the ego vehicle. The resolver module is configured to select a final trajectory decision for the ego vehicle from the plurality of trajectory decisions based on the three-dimensional state space and the plurality of rewards. The current two-dimensional slice includes a current ego location of the ego vehicle and a plurality of current neighboring locations of a plurality of neighboring vehicles at the current time. The plurality of future two-dimensional slices includes a plurality of future ego locations of the ego vehicle and a plurality of future neighboring locations of the plurality of neighboring vehicles at a plurality of future points in time.

In one or more embodiments of the ego vehicle, the resolver module uses reinforcement learning to select the final trajectory decision.

In one or more embodiments, the ego vehicle further includes a control module coupled to the resolver module and configured to navigate the ego vehicle in response to the final trajectory decision.

In one or more embodiments of the ego vehicle, the resolver module is part of a server computer external to the ego vehicle.

In one or more embodiments, the ego vehicle further includes a transmitter configured to transmit the plurality of trajectory decisions to the server computer.

In one or more embodiments, the ego vehicle includes a receiver configured to receive the final trajectory decision from the server computer.

In one or more embodiments of the ego vehicle, the plurality of future points in time represents a plurality of states in the three-dimensional state space that summarizes a plurality of movements of the ego vehicle and the plurality of neighboring vehicles.

In one or more embodiments, the ego vehicle further includes a memory device configured to store lane information. The plurality of decider modules is further configured to generate the plurality of trajectory decisions in response to the lane information.

In one or more embodiments, the ego vehicle further includes a memory device configured to store traffic light information. The plurality of decider modules is further configured to generate the plurality of trajectory decision in response to the traffic light information.

A method for navigation trajectory identification using reinforcement learning is provided herein. The method includes generating a plurality of trajectory decisions for an ego vehicle at a current time using a circuit, generating a current two-dimensional slice of a flat space around the ego vehicle, generating a plurality of future two-dimensional slices of the flat space around the ego vehicle by projecting the current two-dimensional slice of the flat space forward in time, generating a three-dimensional state space by stacking the current two-dimensional slice and the plurality of future two-dimensional slices, generating a plurality of rewards for the plurality of trajectory decisions based on a recent behavior of an ego vehicle, and selecting a final trajectory decision for the ego vehicle from the plurality of trajectory decisions based on the three-dimensional state space and the plurality of rewards. The current two-dimensional slice includes a current ego location of the ego vehicle and a plurality of current neighboring locations of a plurality of neighboring vehicles at the current time. The plurality of future two-dimensional slices includes a plurality of future ego locations of the ego vehicle and a plurality of future neighboring locations of the plurality of neighboring vehicles at a plurality of future points in time.

In one or more embodiments of the method, the reinforcement learning is used to select the final trajectory decision.

In one or more embodiments, the method further includes navigating the ego vehicle in response to the final trajectory decision.

In one or more embodiments of the method, the final trajectory decision is selected by a server computer external to the ego vehicle.

In one or more embodiments, the method further includes transmitting the plurality of trajectory decisions from the ego vehicle to the server computer.

In one or more embodiments, the method further includes receiving the final trajectory decision at the ego vehicle from the server computer.

In one or more embodiments of the method, the plurality of future points in time represents a plurality of states in the three-dimensional state space that summarizes a plurality of movements of the ego vehicle and the plurality of neighboring vehicles.

A navigation network is provided herein. The navigation network includes a plurality of ego vehicles and a server computer. Each respective ego vehicle of the plurality of ego vehicles is configured to generate a plurality of trajectory decisions at a current time, generate a current two-dimensional slice of a flat space around the respective ego vehicle, generate a plurality of future two-dimensional slices of the flat space around the respective ego vehicle by projecting the current two-dimensional slice of the flat space forward in time, generate a three-dimensional state space by stacking the current two-dimensional slice and the plurality of future two-dimensional slices, and generate a plurality of rewards for the plurality of trajectory decisions based on a recent behavior of the respective ego vehicle. The server computer is in communication with the plurality of ego vehicles. The server computer is configured to select a final trajectory decision for each respective ego vehicle from the plurality of trajectory decisions based on the three-dimensional state space and the plurality of rewards. The current two-dimensional slice includes a current ego location of the respective ego vehicle and a plurality of current neighboring locations of the plurality of neighboring vehicles at the current time. The plurality of future two-dimensional slices includes a plurality of future ego locations of the respective ego vehicle and a plurality of future neighboring locations of the plurality of neighboring vehicles at a plurality of future points in time.

In one or more embodiments of the navigation network, the server computer uses reinforcement learning to select the final trajectory decision.

In one or more embodiments of the navigation network, the server computer implements an advanced actor critic model neural network.

In one or more embodiments of the navigation network, the plurality of future points in time represents a plurality of states in the three-dimensional state space that summarizes a plurality of movements of the plurality of ego vehicles and the plurality of neighboring vehicles.

The above features and advantages and other features and advantages of the present disclosure are readily apparent from the following detailed description of the best modes for carrying out the disclosure when taken in connection with the accompanying drawings.

DETAILED DESCRIPTION

Embodiments of the disclosure provide a navigation network system and/or method for rapidly selecting a best steering trajectory for an ego vehicle out of a number of choices at a given time. An ego vehicle is a vehicle that includes sensors that perceive an environment around the vehicle. The navigation network utilizes as input information a collection of plausible trajectory decisions from multiple decider modules. The decider modules are part of the ego vehicle. A current state of the ego vehicle and the decider modules are trained using a neural network for deep reinforcement learning using a grading module external to the neural network. Output data from the neural network is a final trajectory decision selected from among the input trajectory decisions for the ego vehicle to follow.

The navigation network is generally implemented with autonomous vehicles and/or highly automated vehicles (HAV) to select the best steering trajectory rapidly out of a number of choices at a given time. The selection is made by aggregating the collective experiences of multiple vehicles exploring a shared environment. To achieve the aggregation, multi-agent reinforcement learning is used to train an autonomous agent on how to decide between a collection of possible driving trajectories based on the current state of the agent's vehicle (e.g., the ego vehicle). A state representation that summarizes the movements of the other vehicles, as well as map information and traffic information, is also utilized in the training. The result is an efficient process for training multiple vehicles simultaneously in the shared environment, with magnitudes faster training time than traditional state and action spaces. As such, some criteria for a decision resolver trained on a variety of experiences are fulfilled.

Figure 1:
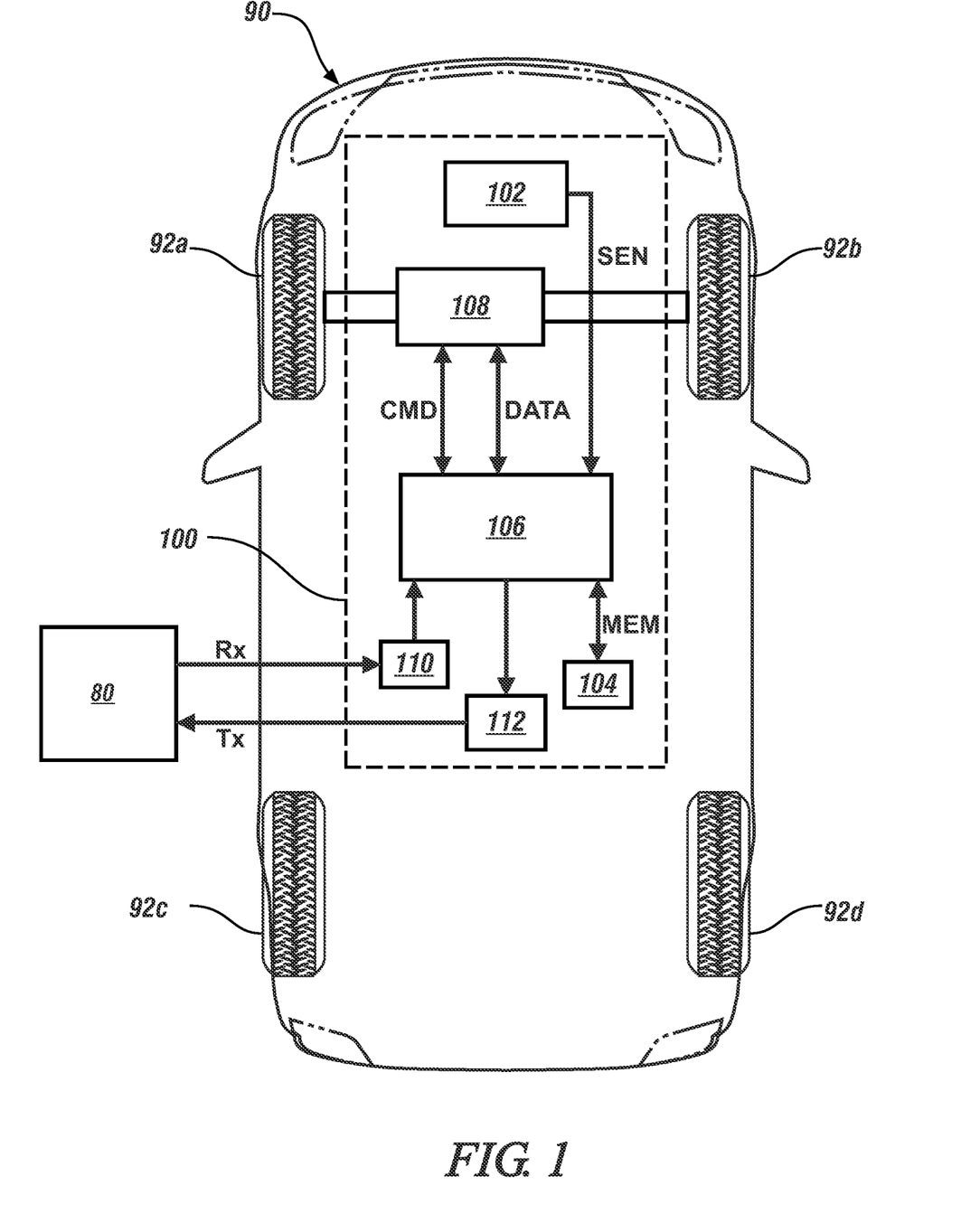
FIG. 1 is a schematic plan diagram illustrating a context of an ego vehicle.

Referring to FIG. 1, a schematic plan diagram illustrating a context of an ego vehicle 90 is shown. The ego vehicle 90 is in communication with a server computer 80. In various embodiments, the server computer 80 is external to the ego vehicle 90. The ego vehicle 90 generally comprises multiple wheels 92a-92d, and an autonomous driving system 100. The autonomous driving system 100 generally comprises sensors 102, a memory device 104, a computer 106, a power plant 108, a receiver 110, and a transmitter 112.

A signal (e.g., SEN) may be generated by the sensors 102 and transferred to the computer 106. The sensor signal SEN may carry information about neighboring vehicles in a portion of the road around the ego vehicle 90. A signal (e.g., CMD) may be exchanged between the computer 106 and the power plant 108. The command signal CMD may convey commands to the power plant 108 to control at least speed, steering and braking operations of the ego vehicle 90. A signal (e.g., DATA) may be exchanged between the computer 106 and the power plant 108. The data signal DATA may transfer data related to the operations of the power plant 108 between the power plant 108 and the computer 106. A signal (e.g., MEM) may be exchanged between the computer 106 and the memory device 104. The memory signal MEM may convey information that defines the roads in an area used by the ego vehicle 90. In various embodiments, the information may include lane information of a physical road (or surface) and traffic light information. Other types of information may be implemented to meet the design criteria of a particular application. A receive signal (e.g., RX) may be transferred from the server computer 80 to the receiver 110. The receive signal RX carries input information about a final trajectory decision for the ego vehicle 90. A transmit signal (e.g., TX) is generated by the transmitter 112 and sent to the server computer 80. The transmit signal conveys trajectory candidates for the ego vehicle 90. In various embodiments, the neighboring vehicles also include copies of the autonomous driving system 100 that exchange similar signals with the server computer 80.

The server computer 80 may be implemented as one or more central computers. The server computer 80 communicates with the ego vehicle 90 via the receive signal RX and the transmit signal TX. Communications with other neighboring vehicles may be achieved by similar receive signals and similar transmit signals with the neighboring vehicles considering themselves as an ego vehicle. The server computer 80 is operational to aggregate collective experiences of the multiple vehicles exploring a shared environment. A resolver module operating within the server computer 80 provides multi-agent reinforcement learning that trains the vehicles, functioning as autonomous agents, on how to decide between a collection of driving trajectories based on current states. State representations summarizing the movements of the vehicles (or agents), as well as map and traffic information, are utilized by the server computer 80 to create an efficient process for training multiple vehicles simultaneously in the shared environment. In some embodiments, the server computer 80 may be implemented within the ego vehicle 90 to provide a fully autonomous driving capability for the ego vehicle 90.

The ego vehicle 90 may be implemented as an automobile (or car). In various embodiments, the ego vehicle 90 may include, but is not limited to, a passenger vehicle, a truck, an autonomous vehicle, a gas-powered vehicle, an electric-powered vehicle, a hybrid vehicle and/or a motorcycle. Other types of ego vehicles 90 may be implemented to meet the design criteria of a particular application.

The wheels 92a-92d may be implemented as road wheels. The wheels 92a-92d are generally operational to provide for movement of the ego vehicle 90 about the ground. In various embodiments, each wheel 92a-92d may include a tire mounted on a rim. The wheels 92a-92d may be used to provide traction between the ego vehicle 90 and the ground on which the ego vehicle 90 is sitting.

The autonomous driving system 100 may be implemented as a power plant and associated electronics suitable for autonomous, semi-autonomous and/or driver-assist operations. The autonomous driving system 100 is generally operational to read a road map that corresponds to a portion (or segment) of the road ahead of (or around) the ego vehicle 90, and execute the final trajectory decision used to steer, accelerate and/or brake the ego vehicle 90. In various embodiments, the road map may range from a few tens of feet to several hundreds of feet in a direction of travel of the ego vehicle 90. The road map may extend ahead of the ego vehicle 90 and/or behind the ego vehicle 90. The road map may also range from several tens of feet wide up to approximately one-hundred feet wide. The road map may extend to a left of the ego vehicle 90 and/or to a right of the ego vehicle 90.

The sensors 102 may be implemented as optical sensors and/or radio-frequency sensors. The sensors 102 are generally operational to sense the movement of the neighboring vehicles moving through the portion of the road about to be traversed by the ego vehicle 90. In various embodiments, the sensors 102 may implement cameras configured to observe the neighboring vehicles, the roadway, and obstacles ahead of the ego vehicle 90. In some embodiments, the sensors 102 may implement a radar device configured to track the environment. In various embodiments, the sensors 102 may be further operational to sense and report lane boundaries painted on the road, where detectable.

The memory device 104 may be implemented as a non-volatile storage device. The memory device 104 is generally operational to store and present the road map information to the computer 106. The road map information may be presented to the computer 106 via the memory signal MEM. The road map information stored in the memory device 104 may be updated from time to time via the memory signal MEM to account for changes in the roads.

The computer 106 may be implemented as one or more electronic control units. The computer 106 is generally operational to gather the sensor information from the sensors 102, read a local portion of the road map from the memory device 104, receive the trajectory decisions from the decider modules, and execute a best way to navigate the ego vehicle 90. In some embodiments, the computer 106 may transfer individual observations and hypotheses of the neighboring vehicles to the server computer 80 via the transmitter 112. The final trajectory decision may be received by the computer 106 via the receiver 110 from the server computer 80. In other embodiments, the computer 106 may implement the resolver module and so act independently of the server computer 80. The computer 106 may autonomously navigate the ego vehicle 90, semi-autonomously help navigate the ego vehicle 90, and/or provide driver assistance for traversing the road in response to the final trajectory decision.

The power plant 108 may be implemented as an engine, a transmission, and a power train of the ego vehicle 90. The power plant 108 is generally operational to propel and steer the ego vehicle 90 in response to one or more commands received from the computer 106 in the signal CMD. The power plant 108 may provide operating information in the signal DATA back to the computer 106.

The receiver 110 may be implemented as a wireless receiver. The receiver 110 is operational to receive the final trajectory decision from the server computer 80 via the receive signal RX. The receiver 110 subsequently conveys the final trajectory decision to the computer 106.

The transmitter 112 may be implemented as a wireless transmitter. The transmitter 112 is operational to transmit multiple trajectory decisions and related information for the ego vehicle 90, as determined by the computer 106, to the server computer 80 in the transmit signal TX.

Figure 2:
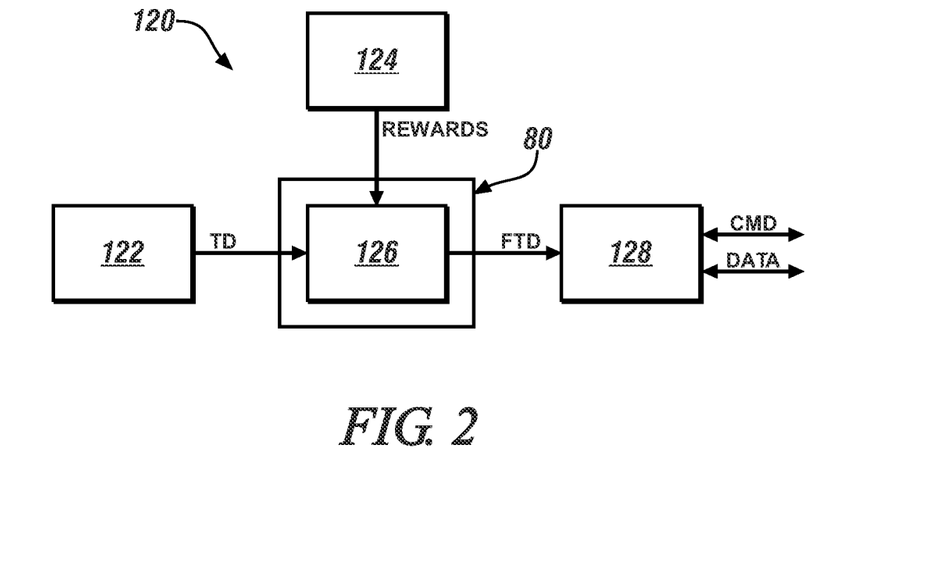
FIG. 2 is a schematic diagram of main components of a navigation trajectory system in accordance with one or more exemplary embodiments.

Referring to FIG. 2, a schematic diagram of an example implementation of several main components of the navigation network 120 is shown in accordance with one or more exemplary embodiments. The navigation network 120 includes four main components: decider modules 122 that generate the trajectory decisions, a grader module 124 that grades/rewards the trajectory decisions, a resolver module 126 that implements a deep reinforcement learning network, and a control module 128 that acts on the final trajectory decision. The resolver module 126 is shown implemented in the server computer 80. The decider modules 122 are in communication with the resolver module 126. The grader module 124 is in communication with the resolver module 126. The resolver module 126 is in communication with the control module 128.

A trajectory decision signal (e.g., TD) is generated by each decider module 122 and transferred to the resolver module 126. The trajectory decision signal TD carries the trajectory decisions. A rewards signal (e.g., REWARDS) is generated by the grader module 124 and is transferred to the resolver module 126. The rewards signal REWARDS carries reward scores for the trajectory decisions based on a recent behavior of the ego vehicle 90. A final trajectory decision signal (e.g., FTD) is generated by the resolver module 126 and is transferred to the control module 128. The final trajectory decision signal FTD conveys the final trajectory decision for the ego vehicle 90 to implement.

At a single time step within a cognitive framework, several candidates for decisions are created by the decider modules 122. The trajectory decisions are subsequently passed to the resolver module 126. With the help of the grader module 124, the resolver module 126 determines which trajectory decision is the most rewarding given the current state of the ego vehicle 90, and presents the best decision as a final trajectory decision to the control module 128. The control module 128 thereafter uses the final trajectory decision to control the ego vehicle 90 in a fully autonomous mode, a semi-autonomous mode, or provides suggestions to the human driver in the case of highly automated vehicles.

Figure 3:
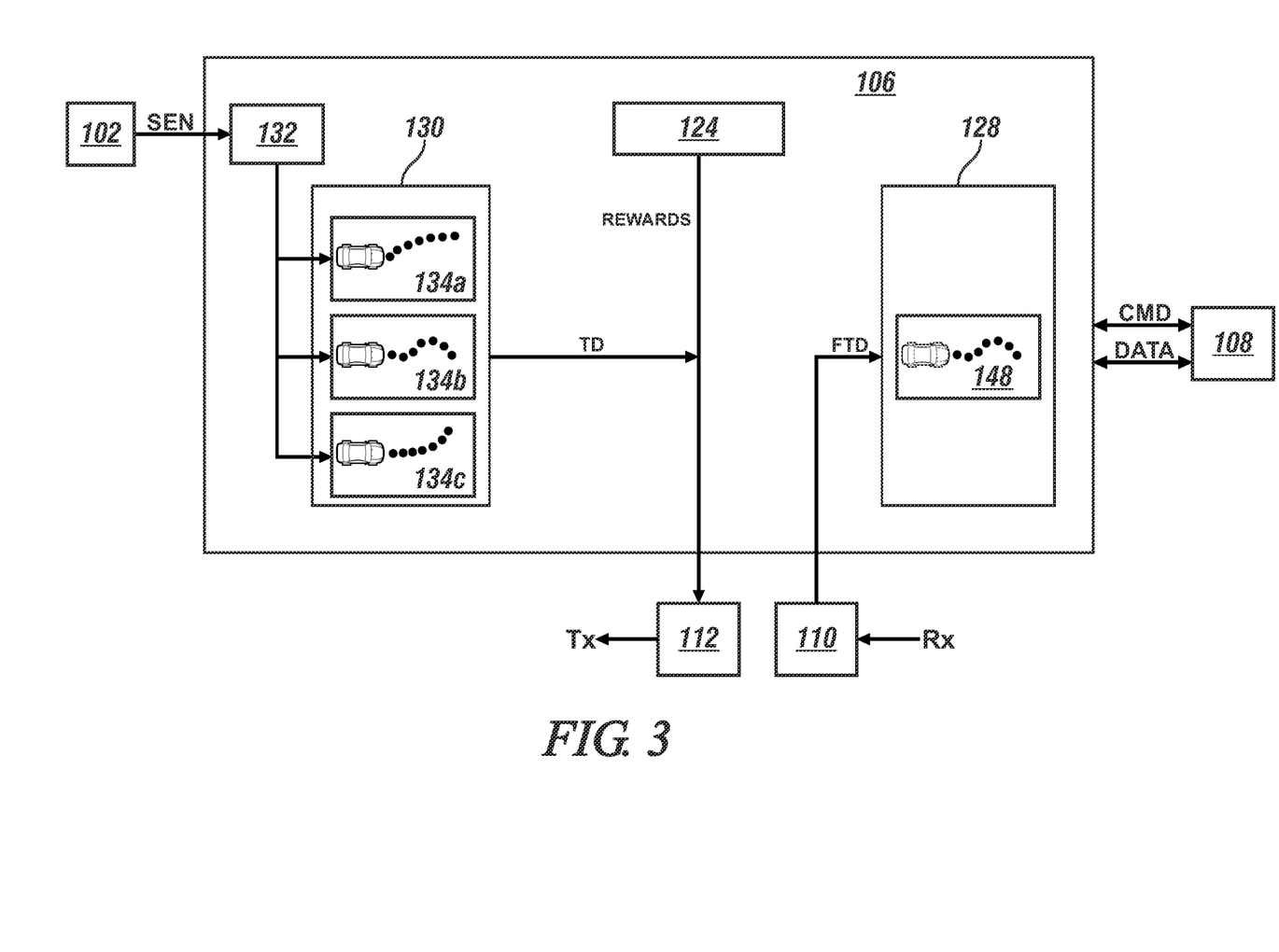
FIG. 3 is a schematic diagram of a computer in accordance with one or more exemplary embodiments.

Referring to FIG. 3, a schematic diagram of an example implementation of the computer 106 is shown in accordance with one or more exemplary embodiments. The computer 106 generally includes the grader module 124, the control module 128, an input circuit 130, and one or more optional directed acyclic graph (DAG) decider modules 132 (one shown for simplicity).

The input circuit 130 is operational to collect multiple trajectory decisions 134a-134c from multiple decider modules at a current time. In various embodiments, the trajectory decisions 134a-134c may be received at the input circuit 130 from the directed acyclic graph decider module 132 acting as multiple local decider modules 122. In some embodiments, the trajectory decisions 134a-134c may be received from multiple directed acyclic graph decider modules 132.

The directed acyclic graph decider module 132 may be implemented as one or more local decider modules. The directed acyclic graph decider module 132 is operational to generate the trajectory decisions 134a-134c using the sensor information received from the sensors 102. By way of example, the directed acyclic graph decider module 132 may generate a directed acyclic graph of three branches. One branch moves straight along the current heading direction of the ego vehicle 90, and the other two branches switch lanes to the left and to the right, respectively. The directed acyclic graph decider module 132 then assigns a pressure field score for each node of each branch by looking at a distance between the node and hypothesized locations of other neighboring vehicles and/or obstacles at a corresponding timestamp of each node. The branch with a best average potential field score is selected as the trajectory decision (e.g., 134a). Each instance of directed acyclic graph decider module 132 may be parameterized by a speed variable. The speed variable may be the speed at which the branches are created. For instance, a higher speed would make the branch nodes more spaced out than a lower speed. By implementing multiple directed acyclic graph decider modules 132 with different speed parameters, multiple trajectory decisions may be presented to the input circuit 130.

Figure 4:
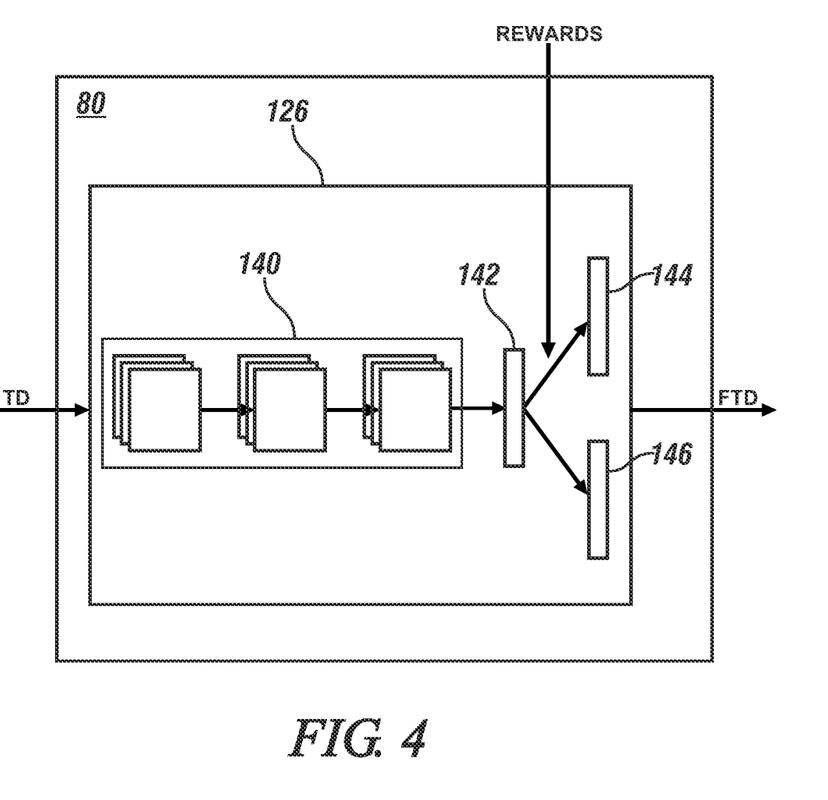
FIG. 4 is a schematic diagram of a server computer in accordance with one or more exemplary embodiments.

Referring to FIG. 4, a schematic diagram of an example implementation of the server computer 80 is shown in accordance with one or more exemplary embodiments. The server computer 80 may include a resolver module 126. The server computer 80 is operational to receive the trajectory decisions and the rewards from the ego vehicle 90 (e.g., via the transmit signal TX shown in FIG. 1) and the neighboring vehicles. The sever computer 80 is also operational to transmit the final decisions to the ego vehicle 90 (e.g., via the receive signal RX shown in FIG. 1) and the neighboring vehicles.

The resolver module 126 may be implemented as a neural network. The resolver module 126 is operational to generate states 140 based on the trajectory decisions received from the vehicles. The resolver module 126 may also be operational to produce result data 142, critic data 144 and actor data 146 based on the states 140 and the rewards generated by the grader modules 124. The final trajectory decisions (e.g., 148) from among the trajectory decisions (e.g., 134a-134c) received from the vehicles (e.g., 90) may be selected by the resolver module 126 and presented to the respective vehicles. Therefore, the resolver module 126 may train the multiple vehicles simultaneously in the neighboring environment.

The resolver module 126 implements a method for training and definitions of the states 140, actions, and rewards. The states 140 are used to train a deep reinforcement learning neural network. An example suitable neural network is an advanced actor critic (A2C) model. The advanced actor critic model uses images as input states (S) and an external reward (R) for training, then outputs an action (A) to take at time (t). Parameters ($\theta$) are trained to maximize the reward. The advanced actor critic model contains two output layers, one for the policy $\pi(A_t|S_t; \theta)$, and one for the value $V(S_t; \theta_v)$.

In various embodiments, the resolver module 126 implements the advantage actor critic model as the neural-network-based reinforcement learning method to learn which decider module 122 is best for a given state in the driving environment. The neural-network-based reinforcement learning method generally supports a large number of agents training in the same environment, and has proven effective in many dynamic environments. The following update rule is performed on the neural network:

$$\nabla'_\theta \log \pi(A_t|S_t;\theta') F_{adv}(S_t, A_t;\theta,\theta_v)$$

The advantage function $F_{adv}(S_t, A_t; \theta, \theta_v)$ is defined as:

$$\sum_{k=0}^{k-1} \gamma^i r_{t+i} + \gamma^k V(S_{t+k}; \theta_v) - V(S_t; \theta_v)$$

Where k is the number of time steps in a training iteration. An asynchronous version of advanced actor critic model (called AC3) may also be implemented in the resolver module 126.

A structure of an example neural network is a convolutional network with the following layers:
1. Input: Dim—40×40×3
2. Convolution: Filters—32, Kernel Size—8×8, Stride—4×4, Activation—ReLu
3. Convolution: Filters—64, Kernel Size—4×4, Stride—2×2, Activation—ReLu 4. Convolution: Filters—64, Kernel Size—3×3, Stride—1×1, Activation—ReLu
5. Fully Connected: Dim—512, Activation—ReLu
6. Policy Output: Dim—4
7. Value Output: Dim—1

Considering the ego vehicle 90 shown in FIGS. 1 and 3, the action output of the resolver module 126 is an integer indicating the identification of the trajectory decision 134a-134c to choose. In the resolver module 126, each integer corresponds to a unit in the policy output layer. The reward value is a scalar measurement used to learn the values of input states. The reward value may be determined by a calculation of distances between the ego vehicle 90 and the other vehicles, or a tailored reward function. In various embodiments, the reward value comes from the grader module 124 that provides a best grade based on the recent behavior of the ego vehicle 90. From the action output of the neural network, the identification of a selected one of the trajectory decisions 134a-134c is designated as the final trajectory decision 148. The final trajectory decision 148 is presented from the resolver module 126 through the receiver 110 to the control module 128 to be acted upon by the ego vehicle 90.

Figure 5:
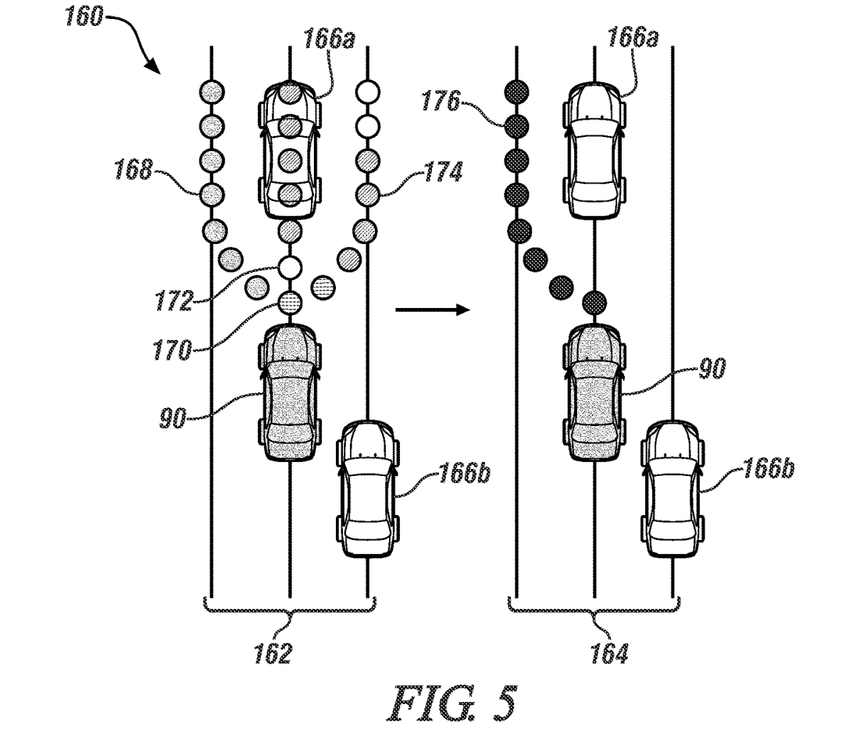
FIG. 5 is a schematic plan diagram of a decider trajectory generation in accordance with one or more exemplary embodiments.

Referring to FIG. 5, a schematic plan diagram 160 of example decider trajectory generation is shown in accordance with one or more exemplary embodiments. The diagram 160 includes a create-and-score trajectory diagram 162 and a selection-best-trajectory diagram 164. Each diagram 162 and 164 illustrates the ego vehicle 90 with a first neighboring vehicle 166a ahead of and in the same lane as the ego vehicle 90. Each diagram 162 and 164 also illustrates a second neighboring vehicle 166b behind and in a different lane as the ego vehicle 90. Generation of the candidate trajectory decisions may be implemented by the directed acyclic graph decider module 132 within the ego vehicle 90.

The directed acyclic graph decider module 132 creates a directed acyclic graph having three trajectory branches for driving straight, switching left a lane, and switching right a lane. A pressure field score is assigned to each node (circles) according to a distance between the node and future hypothesized neighboring locations of the other neighboring vehicles 166a-166b (generally referred to as neighboring vehicles 166). In the diagram 162, a lowest (best) pressure score 170 may be associated with nodes that are clear for the ego vehicle 90 to occupy. An intermediate pressure score 168 is associated with nodes that the ego vehicle 90 could navigate through. A strong pressure score 172 may be associated with nodes that the ego vehicle 90 could reach with some concern. A highest (worst) pressure score 174 is associated with nodes that the ego vehicle 90 should avoid. The branch with the best average potential field score is selected as the best trajectory option (e.g., the nodes 176) as illustrated in the diagram 164.

Each trajectory decision provided as input information to the input circuit 130 may be generated using a separate strategy. For example, one trajectory decision may be produced by choosing a constant speed, creating branches for possible maneuvers, scoring the branches based on distance to the other neighboring vehicles 166, and selecting the branch with the best score. The best trajectory serves as a single trajectory decision within the collection of the multiple trajectory decisions 134a-134c gathered by the input circuit 130.

Figure 6:
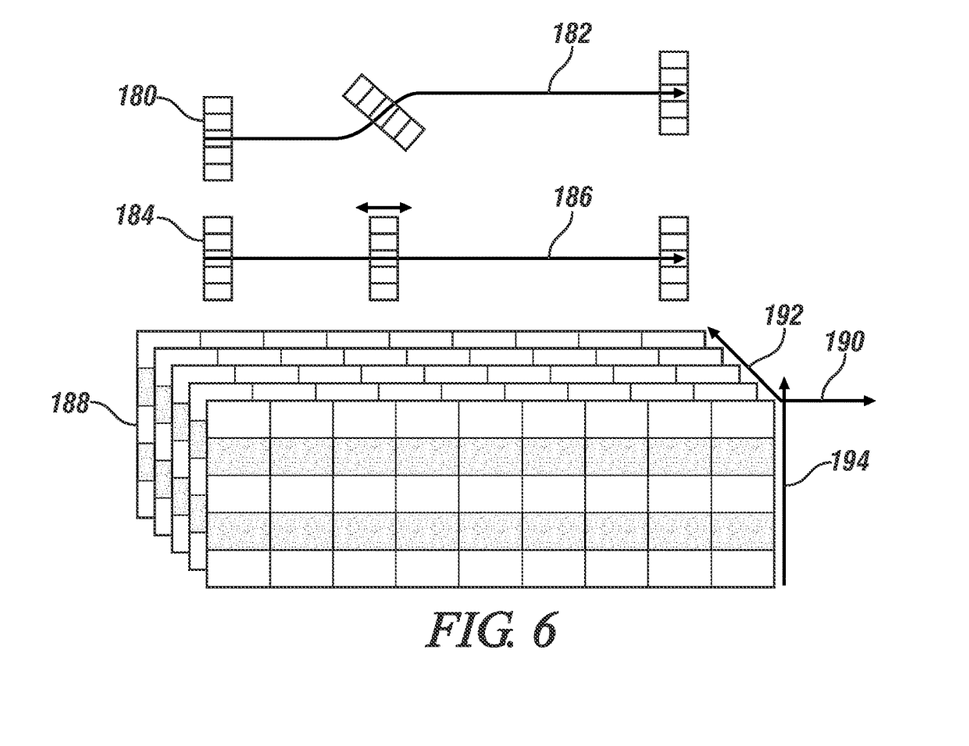
FIG. 6 is a schematic diagram of a translation from a real vehicle perspective to reinforcement learning states in accordance with one or more exemplary embodiments.

Referring to FIG. 6, a schematic diagram of an example translation from a real vehicle perspective to the reinforcement learning states 140 is shown in accordance with one or more exemplary embodiments. A real trajectory 180 illustrates the ego vehicle 90 traversing a curved road 182. Each rectangle represents a short (e.g., 400 to 600 millisecond) period. An egocentric trajectory 184 illustrates the curved road 182 as a straight road 186 as seen from a point of view in the ego vehicle 90. Each rectangle representing the short period.

From the real trajectory 180, a current two-dimensional slice is produced by the directed acyclic graph decider module 132. The two-dimensional current slice represents a current state along a specific time horizon. The two-dimensional current slice contains the current ego location of the ego vehicle 90 and the current neighboring locations of the neighboring vehicles 166 at the current time. The two-dimensional current slice may be projected forward for each future time step along the specified time horizon by the directed acyclic graph decider module 132. The future two-dimensional slices contain the future ego location of the ego vehicle 90 and the future neighboring locations of the neighboring vehicles 166. The two-dimensional slices are stacked together by the directed acyclic graph decider module 132 to form a three-dimensional state space 188. The three-dimensional state space 188 may include a time dimension 190, a flat space dimension 192, and a road width dimension 194.

The three-dimensional state space 188 may take the form of a three-dimensional tensor. To convert a current state of traffic into the three-dimensional tensor, the future two-dimensional slices of flat space are stacked, each representing a time point in the future. In each slice, the hypothesized location of each vehicle is represented as a maximum value (e.g., 255) in a grid that is otherwise filled with minimum values (e.g., 0). The grid is fixed and oriented to the location and heading of the ego vehicle 90, with a height and a width of each grid square determined by a width and a current speed of the ego vehicle 90. Additional information may also be included in the grids, including map features such as lanes and traffic signals. The three-dimensional state space 188 may be transferred to the resolver module 126 for further processing. The additional information provides further context for the neural network to make informed choices.

Figure 7:
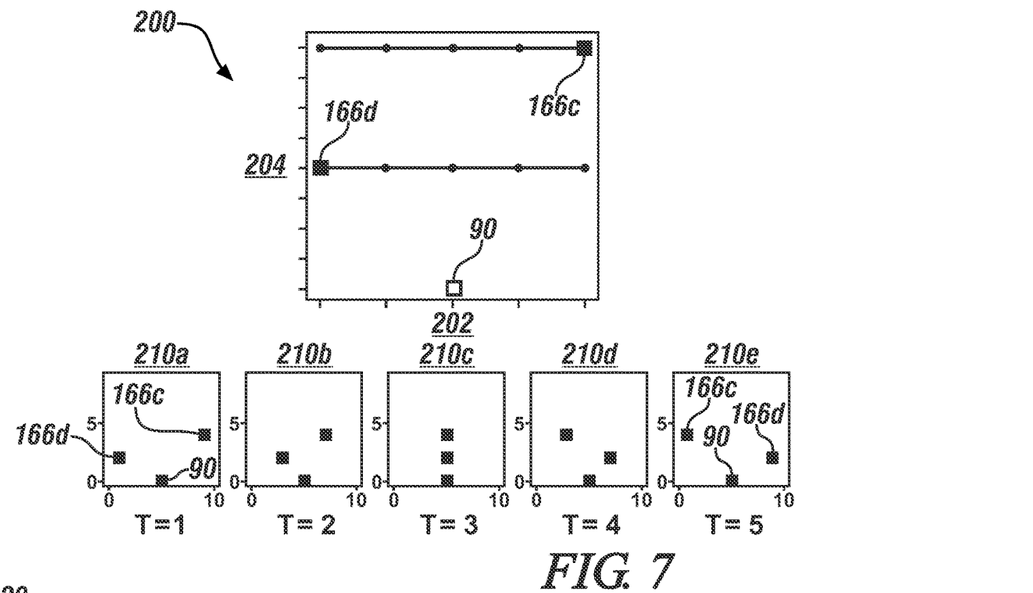
FIG. 7 is a schematic diagram of a current two-dimensional grid in accordance with one or more exemplary embodiments.

Referring to FIG. 7, a schematic diagram of an example format of a current two-dimensional grid 200 is shown in accordance with one or more exemplary embodiments. An axis 202 of the current two-dimensional grid 200 defines a direction extending to the left and the right of the ego vehicle 90. An axis 204 of the current two-dimensional grid 200 defines a direction extending ahead of and behind the ego vehicle 90. The current two-dimensional grid 200 includes the ego vehicle 90 and several (e.g., two) neighboring vehicles 166c-166d. The neighboring vehicle 166c is shown as a right-to-left crossing vehicle ahead of the ego vehicle 90. The neighboring vehicle 166d is shown as a left-to-right crossing vehicle ahead of the ego vehicle 90.

A reinforcement learning state of the system is summarized into a series of two-dimensional grids 210a-210e projecting forward into the future. The two-dimensional grid 210a may be at a time T=1 (e.g., the current two-dimensional grid 200). The two-dimensional grid 210b may be at a time T=2, and so on. The two-dimensional grids 210a-210e are fixed relative to the ego location and heading of the ego vehicle 90. The hypothesized future neighboring locations of the neighboring vehicles 166c-166d in the environment are represented as squares within the two-dimensional grids 210a-210e.

Figure 8:
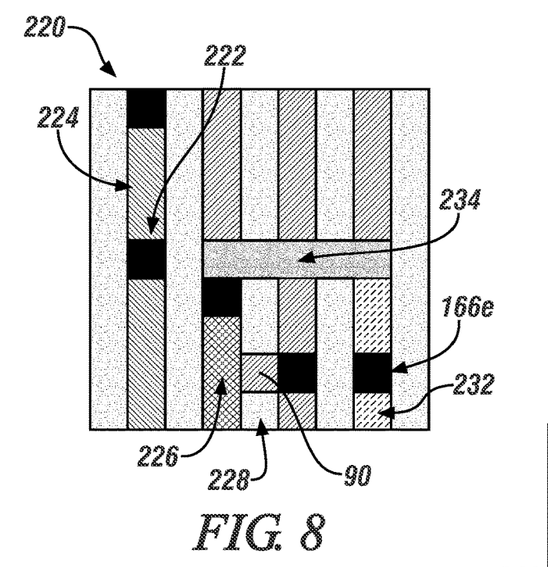
FIG. 8 is a schematic diagram of an enhanced current two-dimensional grid in accordance with one or more exemplary embodiments.

Referring to FIG. 8, a schematic diagram of an example enhanced current two-dimensional grid 220 is shown in accordance with one or more exemplary embodiments. The enhanced current two-dimensional grid 220 may be the current two-dimensional grid 200 (FIG. 7) with additional information. Some of the additional information may be static (e.g., lanes) and thus stored in the memory 104. Other additional information may be dynamic (e.g., obstacles) and so detected by the sensors 102. The additional information may include, but is not limited to traffic cones or other blockages 222, opposing lanes 224, a left-turn-only lane 226, a lane along a normal route 228, another neighboring vehicle 166e in a right-turn-only lane 232, and a traffic light and/or a traffic sign 234. The additional information may be used to enhance the current two-dimensional grid 220 to enable the resolver module 126 to make a more informed choice among the trajectory decisions 134a-134c.

Figure 9:
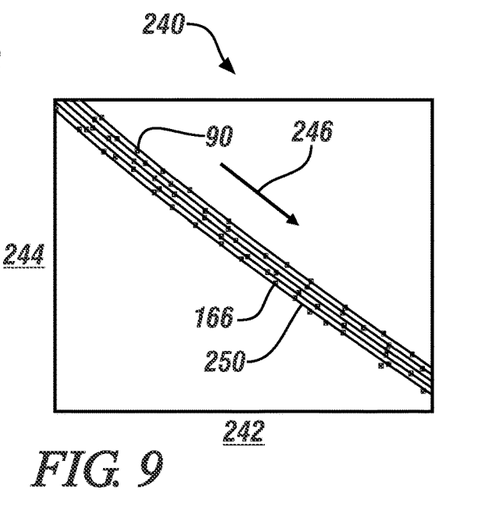
FIG. 9 is a diagram of a visualization of a highway data set in accordance with one or more exemplary embodiments.

Referring to FIG. 9, a diagram 240 of a visualization of a highway data set is shown in accordance with one or more exemplary embodiments. The diagram 240 includes a first dimension 242 (e.g., East-West) and a second dimension 244 (e.g., North-South). Multiple lane centers 250 are shown in the diagram 240. The ego vehicle 90 and the neighboring vehicles 166 are illustrated as squares. The vehicles 90/166 are moving in a direction of travel 246.

A demonstrational training setup of the autonomous driving system 100 was performed using an existing open-source implementation of the advanced actor critic model in Python TensorFlow. The implementation allowed for custom environments, dynamics, and rewards to be plugged into the existing framework. In the demonstration, a custom environment was created that modeled the lanes 250. The environment was populated with vehicle trajectories from a predetermined data set.

Single agent training: an ability of the resolver module 126 was confirmed in a semi-closed loop setting on a section of the predetermined data. The semi-closed loop was defined as the main agent (e.g., the ego vehicle 90) reacting to other agents (e.g., the neighboring vehicles 166), but the other agents not reacting to the main agent or to each other. During the training, the ego vehicle 90 moved using the trajectory decisions generated by multiple directed acyclic graph decider modules 132, as chosen by the resolver module 126, while the neighboring vehicles 166 moved along their recorded trajectories. The directed acyclic graph decider modules 132 were directed to generate paths heading toward the South-East and toward the rightmost lane 250. Default training parameters in the original source code where used, and with a learning rate of 7e-2. The configuration parameters used were as follows:

Advanced actor critic model parameters for single agent training:
  num_envs: 1,
  unroll_time_steps: 5,
  num_stack: 4,
  num_iterations: 4e6,
  learning_rate: 7e-2,
  reward_discount_factor: 0.99,
  max_to_keep: 4

Figure 10:
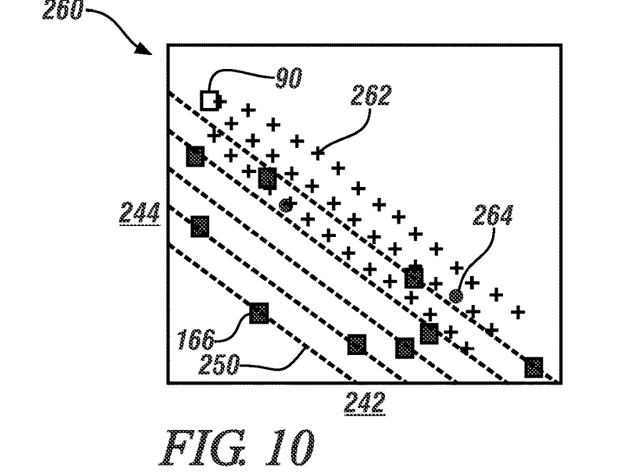
FIG. 10 is a diagram at a start of training on the highway data set in accordance with one or more exemplary embodiments.

Referring to FIG. 10, a diagram 260 at a start of training on an example highway data set is shown in accordance with one or more exemplary embodiments. The ego vehicle 90 is shown in the leftmost lane 250 in the upper left corner. The neighboring vehicles 166 are shown scattered among various lanes 250.

At the start of the training (e.g., iteration 0), after the advanced actor critic model decided which trajectory decisions from which directed acyclic graph decider module 132 to use, the candidate trajectory decisions from that directed acyclic graph decider module 132 are plotted, with the pressure scores of each node (e.g., '+' symbols 262 and the circle symbols 264) displayed on the diagram 260. The symbols 262 represent nodes where the ego vehicle 90 may reside at a suitable distance from the neighboring vehicles 166. The symbols 264 represent nodes where issues may arise when accounting for hypothesized neighboring locations of the neighboring vehicles 166.

Figure 11:
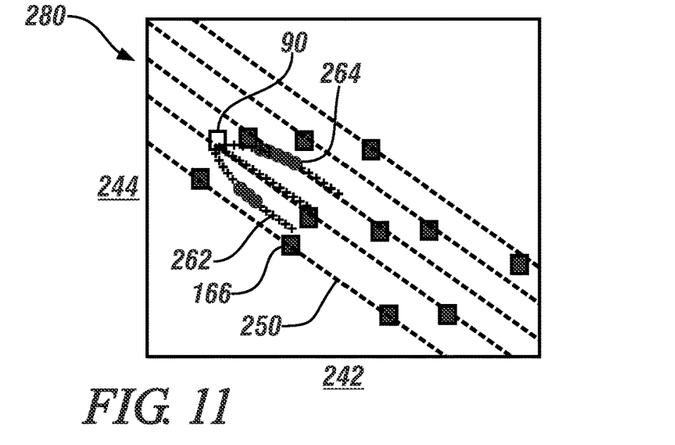
FIG. 11 is a diagram of the training at 720 iterations in accordance with one or more exemplary embodiments.

Referring to FIG. 11, a diagram 280 of the training at 720 iterations is shown in accordance with one or more exemplary embodiments. Before training (e.g., FIG. 10), the ego vehicle 90 behaved erratically, moving faster than the neighboring vehicles 166 and changing speeds frequently. After training for 720 iterations, the ego vehicle 90 chose a consistent speed that matched the neighboring vehicles 166 while maintaining a suitable distance, and minimizing changes between time slices.

Figure 12:
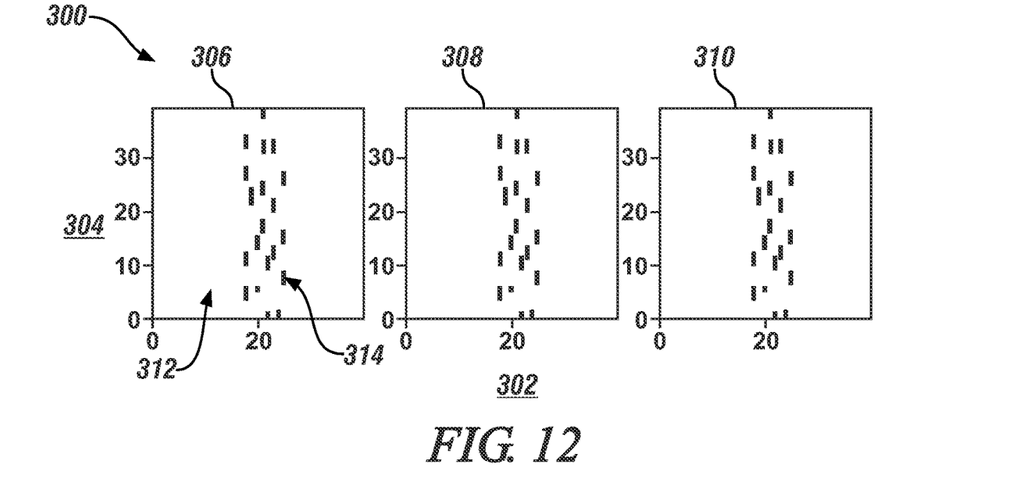
FIG. 12 is a diagram of a state space at three time steps in accordance with one or more exemplary embodiments.

Referring to FIG. 12, a diagram 300 of an example state space at three time steps is shown in accordance with one or more exemplary embodiments. The state space may have a lateral dimension 302 and a longitudinal dimension 304. A slice 306 at an initial time step shows most of the slice 306 has a value of 0 (white areas 312) and the vehicles (dark areas 314) are represented by a value of 255. A slice 308 at a next time step shows some movement of the vehicles. A slice 310 at a subsequent time step shows more movement of the vehicles.

Tensor board visualizations from the advanced actor critic model training displayed rewards over training. In the demonstration, the reward value is tuned to be a maximum reward value (e.g., 1) as a default and a minimum or no reward value (e.g., 0) if there is interference with another vehicle. Rewards dropped quickly during these instances, but eventually leveled off as the ego vehicle 90 learned to drive smoothly. As a control, the training was repeated using rewards uniformly sampled from a range of 0 to 1. In the control, the behavior remained approximately the same.

Figure 13:
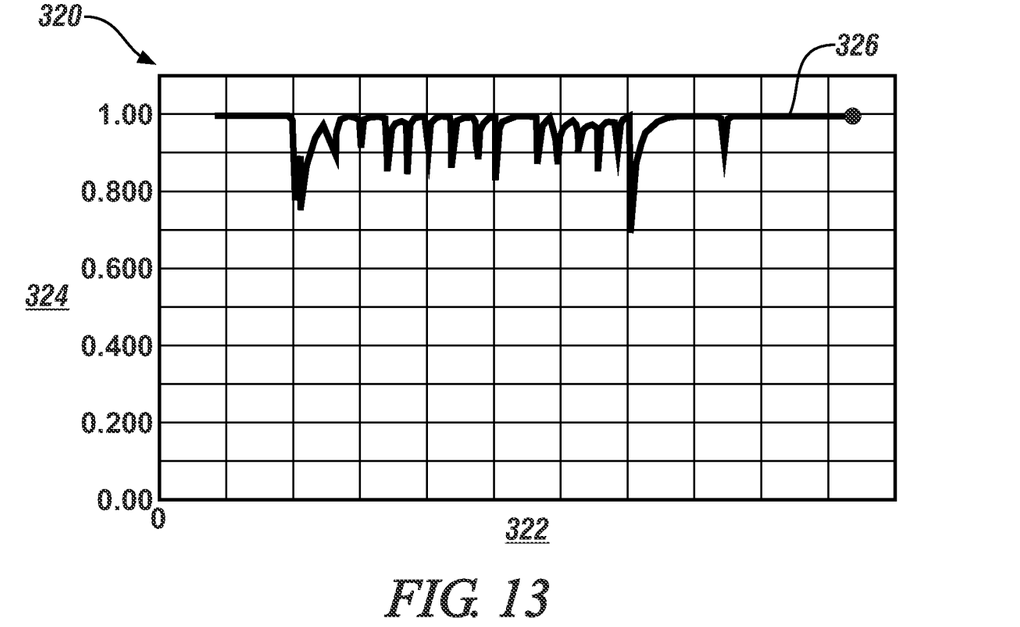
FIG. 13 is a graph of rewards obtained in each iteration of a single run of training using a first rewards technique in accordance with one or more exemplary embodiments.

Referring to FIG. 13, a graph 320 of example rewards obtained in each iteration of a single run of training using a first rewards technique is shown in accordance with one or more exemplary embodiments. The axis 322 of the graph 320 illustrates time. The axis 324 of the graph 320 illustrates the rewards in a range of 0 (no reward) to 1 (maximum reward). In the first reward technique, rewards of 1 were given as a default. Rewards of 0 were given for interferences between the ego vehicle 90 and one or more of the neighboring vehicles 166. A curve 326 illustrates a smoothed average of the rewards. Dips in the curve 326 indicate where a reward of 0 was given. The curve 326 generally shows that the number of interferences decreases as the resolver module 126 learns the correct policy.

Figure 14:
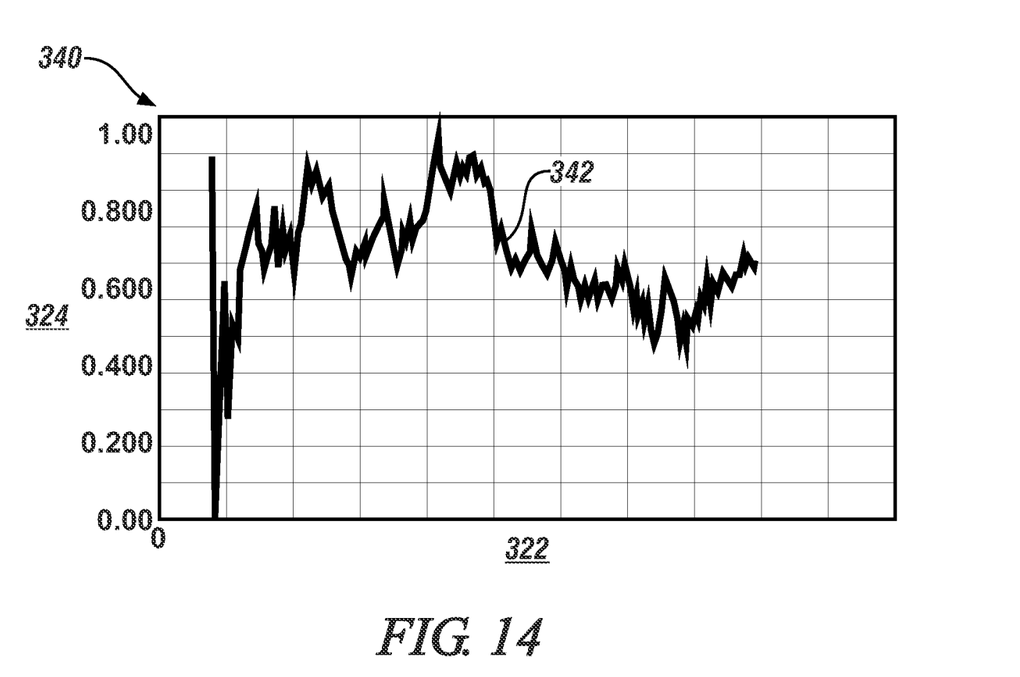
FIG. 14 is a graph of rewards obtained in each iteration of the single run of training using a second rewards technique in accordance with one or more exemplary embodiments.

Referring to FIG. 14, a graph 340 of example rewards obtained in each iteration of the single run of training using a second rewards technique is shown in accordance with one or more exemplary embodiments. The axis 322 of the graph 340 illustrates time. The axis 324 of the graph 340 illustrates the rewards in the range of 0 to 1. In the second reward technique, rewards were generated randomly in the range of 0 (no reward) to 1 (maximum reward). A curve 342 illustrates a smooth average of the rewards. The curve 342 shows that the number of interferences is random over time.

Figure 15:
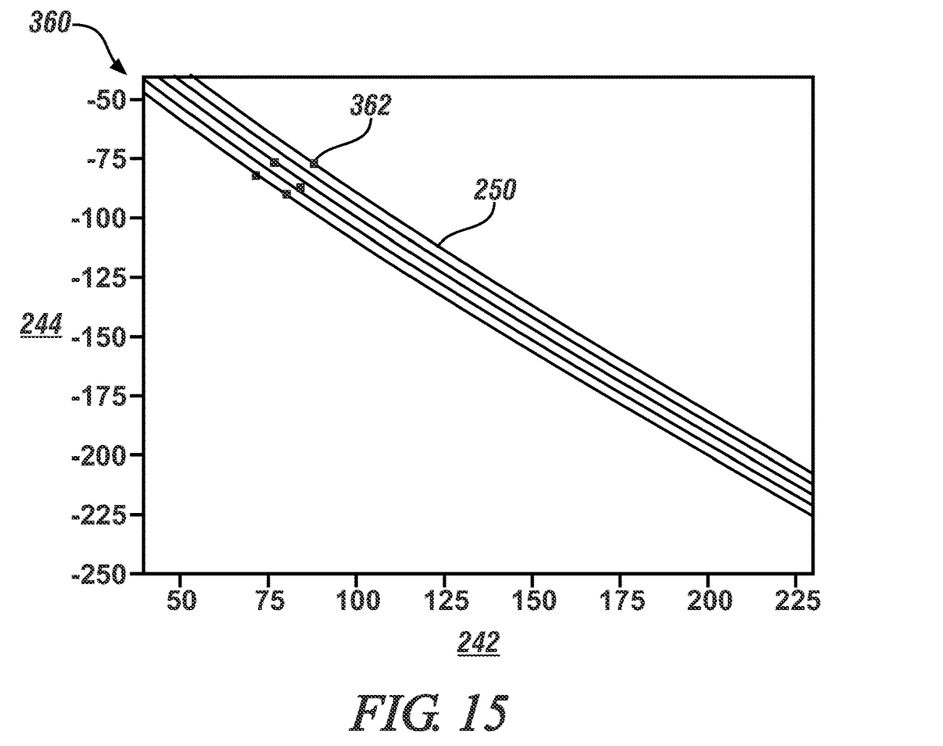
FIG. 15 is a diagram of a multi-agent training environment in accordance with one or more exemplary embodiments.

Referring to FIG. 15, a diagram 360 of a multi-agent training environment is shown in accordance with one or more exemplary embodiments. The diagram 360 includes the first dimension 242 and the second dimension 244.

Multiple lane centers 250 are illustrated as lines. Multiple (e.g., five) vehicles 362 are illustrated as squares.

Scalability of the resolver module 126 was tested by expanding the environment to include multiple agents training simultaneously on a shared instance of a next generation simulation (NGSIM) highway. The training used a purely closed loop setting, with no preprogrammed agents and the existing agents reacting to each other. To achieve this, a shared Python class was created to keep track of the agent locations, hypotheses, and renderings of the environment. A separate thread for each agent calculated individual rewards, determined the action at each step, and communicated with a central process for training the advanced actor critical model. The individual threads communicated with the environment class using ZeroMQ sockets. The testing showed rough movements in iteration 0, and smoother, more coordinated movements in 1000 iterations. The same training parameters were used as with the single agents, and with the "num_envs" parameter as 5.

Figure 16:
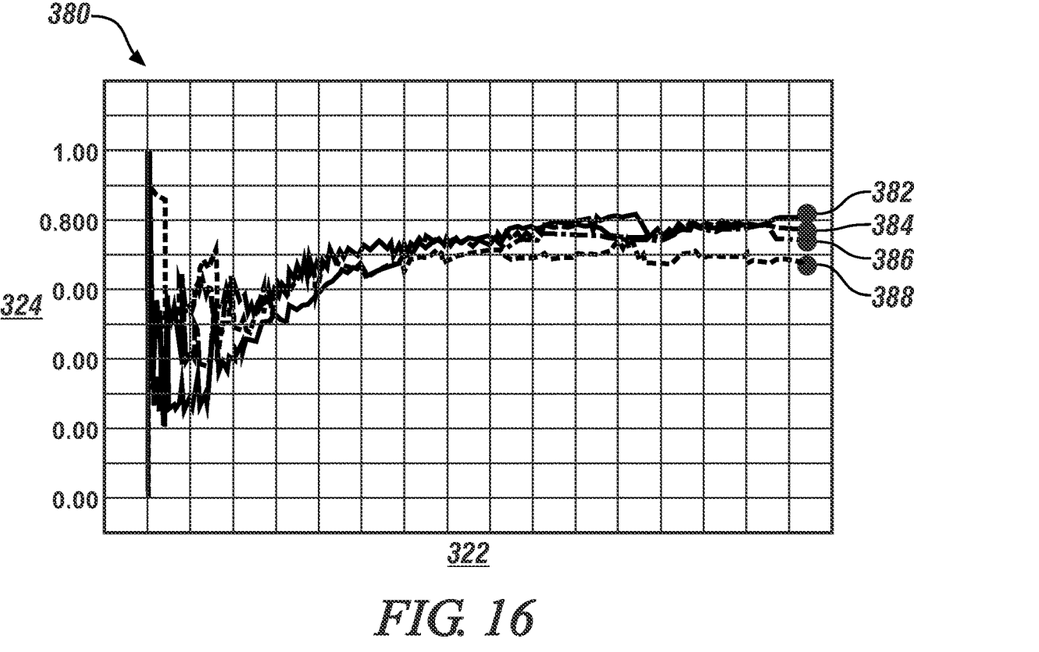
FIG. 16 is a graph of a set of rewards obtained in each iteration of the multi-agent training environment in accordance with one or more exemplary embodiments.

Referring to FIG. 16, a graph 380 of an example set of rewards obtained in each iteration of the multi-agent training environment is shown in accordance with one or more exemplary embodiments. The axis 322 represents time. An axis 324 represents the rewards in the range of 0 to 1. Curves 382, 384, 386, and 388 illustrate individual agents training in the shared environment with the other agents. The curves 382, 384, 386, and 388 generally show that the agents learn at approximately the same pace.

In various embodiments of the navigation network, representations of the current states of the ego vehicles are used to make decisions. The navigation network converts vehicle positions, traffic states, and map data into a grid-based representation for entry into the resolver modules 126. The navigation network provides a flexible framework for resolving decisions, in which the technique for producing the trajectory decision inputs and the grader modules 124 for training the neural networks in the resolver modules 126 may be implemented in various manners. The navigation network identifies best steering trajectories in autonomous vehicles that receives collections of plausible steering trajectories, transforms the current states of the autonomous vehicles and surrounding agents into a compact grid state, applies the states to deep reinforcement learning neural networks, and outputs the final trajectory decisions of choice.

The navigation network increases the convenience of passengers in the autonomous vehicles/highly automated vehicles that use modular cognitive architectures for control. For instance, the autonomous agent may have several different strategies for generating decisions on future trajectories to take. Choosing the best strategy to employ depends on the situation at hand. The resolver module uses deep reinforcement learning combined with a separate grading module to determine which features of the environment are relevant for picking the best strategy. Moreover, the advantage actor critic neural network has been successfully employed on the data of multiple agents experiencing different situations. The network may subsequently leverage the data of multiple cars running in a shared physical space, creating dynamic interactions between the cars as they learn to coordinate their behavior. Additionally, the input space captures the environment in a grid state that incorporates many contextual cues without adding unnecessary complexity to the problem space. This reduces the resources consumed for training.

The navigation network exploits trajectory decisions in autonomous driving that follow physics laws and are maneuver-based (e.g., driving straight, switching lanes). To learn these movements by common techniques from raw data utilizes a large amount of time and data. By providing the input information as fully formed trajectory decisions based on physics priors, the navigation network simplifies the problem. Moreover, the neural networks can focus training more on contextual cues such as traffic lights and lane restrictions provided in the input states. Rather than an end-to-end approach that would learn perceptual recognition of signals and lane types, the navigation networks abstract these tasks to focus on which trajectory decisions are best given the contextual cues.

While the best modes for carrying out the disclosure have been described in detail, those familiar with the art to which this disclosure relates will recognize various alternative designs and embodiments for practicing the disclosure within the scope of the appended claims.

What is claimed is:

1. An ego vehicle comprising:
  a plurality of decider modules coupled to a resolver module, and configured to
    generate a plurality of trajectory decisions for the ego vehicle at a current time,
    generate a plurality of candidate trajectory decisions for a plurality of neighboring vehicles at the current time,
    generate a current two-dimensional horizontal representation of a flat space in front of, to a left of, to a right of, and behind the ego vehicle, wherein the current two-dimensional horizontal representation includes a current ego location of the ego vehicle and a plurality of current neighboring locations of the plurality of neighboring vehicles at the current time,
    generate a plurality of future two-dimensional horizontal representations of the flat space around the ego vehicle by estimating a plurality of future ego locations of the ego vehicle and a plurality of future neighboring locations of the plurality of neighboring vehicles at a plurality of future points in time based on the plurality of trajectory decisions and the plurality of candidate trajectory decisions, wherein the plurality of future ego locations are different than the current ego location, and the plurality of future neighboring locations are different than the plurality of current neighboring locations, and
    generate a three-dimensional state space by stacking the current two-dimensional horizontal representation and the plurality of future two-dimensional horizontal representations, wherein the three-dimensional state space includes a time dimension, a flat space dimension, and a road width dimension;
  a grader module coupled to the resolver module, and configured to generate a plurality of rewards for the plurality of trajectory decisions based on a recent behavior of the ego vehicle, wherein the resolver module is configured to select a final trajectory decision for the ego vehicle from the plurality of trajectory decisions based on the three-dimensional state space and the plurality of rewards; and
  a control module coupled to the resolver module and configured to navigate the ego vehicle in response to the final trajectory decision.

2. The ego vehicle according to claim 1, wherein the resolver module uses reinforcement learning to select the final trajectory decision.

3. The ego vehicle according to claim 1, wherein the resolver module is part of a server computer external to the ego vehicle.

4. The ego vehicle according to claim 3, further comprising a transmitter configured to transmit the plurality of trajectory decisions to the server computer.

5. The ego vehicle according to claim 3, further comprising a receiver configured to receive the final trajectory decision from the server computer.

6. The ego vehicle according to claim 1, wherein the plurality of future points in time represents a plurality of states in the three-dimensional state space that summarizes a plurality of movements of the ego vehicle and the plurality of neighboring vehicles.

7. The ego vehicle according to claim 1, further comprising a memory device configured to store lane information, wherein the plurality of decider modules is further configured to generate the plurality of trajectory decisions in response to the lane information.

8. The ego vehicle according to claim 1, further comprising a memory device configured to store traffic light information, wherein the plurality of decider modules is further configured to generate the plurality of trajectory decisions in response to the traffic light information.

9. A method for navigation trajectory identification comprising:
- generating a plurality of trajectory decisions for an ego vehicle at a current time using a circuit;
- generating a plurality of candidate trajectory decisions for a plurality of neighboring vehicles at the current time;
- generating a current two-dimensional horizontal representation of a flat space in front of, to a left of, to a right of, and behind the ego vehicle, wherein the current two-dimensional horizontal representation includes a current ego location of the ego vehicle and a plurality of current neighboring locations of the plurality of neighboring vehicles at the current time;
- generating a plurality of future two-dimensional horizontal representations of the flat space around the ego vehicle by estimating a plurality of future ego locations of the ego vehicle and a plurality of future neighboring locations of the plurality of neighboring vehicles at a plurality of future points in time based on the plurality of trajectory decisions and the plurality of candidate trajectory decisions, wherein the plurality of future ego locations are different than the current ego location, and the plurality of future neighboring locations are different than the plurality of current neighboring locations;
- generating a three-dimensional state space by stacking the current two-dimensional horizontal representation and the plurality of future two-dimensional horizontal representations, wherein the three-dimensional state space includes a time dimension, a flat space dimension, and a road width dimension;
- generating a plurality of rewards for the plurality of trajectory decisions based on a recent behavior of the ego vehicle;
- selecting a final trajectory decision for the ego vehicle from the plurality of trajectory decisions based on the three-dimensional state space and the plurality of rewards; and
- navigating the ego vehicle in response to the final trajectory decision.

10. The ego vehicle according to claim 1, wherein the three-dimensional state space forms a three-dimensional tensor.

11. The method according to claim 9, wherein a reinforcement learning is used to select the final trajectory decision.

12. The method according to claim 9, wherein the final trajectory decision is selected by a server computer external to the ego vehicle.

13. The method according to claim 12, further comprising:
- transmitting the plurality of trajectory decisions from the ego vehicle to the server computer.

14. The method according to claim 12, further comprising:
- receiving the final trajectory decision at the ego vehicle from the server computer.

15. The method according to claim 9, wherein the plurality of future points in time represents a plurality of states in the three-dimensional state space that summarizes a plurality of movements of the ego vehicle and the plurality of neighboring vehicles.

16. A navigation network comprising:
- a plurality of ego vehicles, each respective ego vehicle being configured to
  - generate a plurality of trajectory decisions for the respective ego vehicle at a current time,
  - generating a plurality of candidate trajectory decisions for a plurality of neighboring vehicles at the current time;
  - generate a current two-dimensional horizontal representation of a flat space in front of, to a left of, to a right of, and behind the respective ego vehicle, wherein the current two-dimensional horizontal representation includes a current ego location of the respective ego vehicle and a plurality of current neighboring locations of the plurality of neighboring vehicles at the current time,
  - generate a plurality of future two-dimensional horizontal representations of the flat space around the respective ego vehicle by estimating a plurality of future ego locations of the respective ego vehicle and a plurality of future neighboring locations of the plurality of neighboring vehicles at a plurality of future points in time based on the plurality of trajectory decisions and the plurality of candidate trajectory decisions, wherein the plurality of future ego locations are different than the current ego location, and the plurality of future neighboring locations are different than the plurality of current neighboring locations,
  - generate a three-dimensional state space by stacking the current two-dimensional horizontal representation and the plurality of future two-dimensional horizontal representations, wherein the three-dimensional state space includes a time dimension, a flat space dimension, and a road width dimension, and
  - generate a plurality of rewards for the plurality of trajectory decisions based on a recent behavior of the respective ego vehicle; and
- a server computer in communication with the plurality of ego vehicles, and configured to select a final trajectory decision for each respective ego vehicle from the plurality of trajectory decisions based on the three-dimensional state space and the plurality of rewards.

17. The navigation network according to claim 16, wherein the server computer uses reinforcement learning to select the final trajectory decision.

18. The navigation network according to claim 16, wherein the server computer implements an advanced actor critic model neural network.

19. The navigation network according to claim 16, wherein the plurality of future points in time represents a plurality of states in the three-dimensional state space that summarizes a plurality of movements of the plurality of ego vehicles and the plurality of neighboring vehicles.

20. The navigation network according to claim 16, wherein each respective ego vehicle is further configured to navigate in response to the final trajectory decision for each respective ego vehicle.

* * * * *